O. Tufts. Sheet 1. 2 Sheets.
Hand Printg Press.
No. 6679X
Patented Jul. 30. 1831.
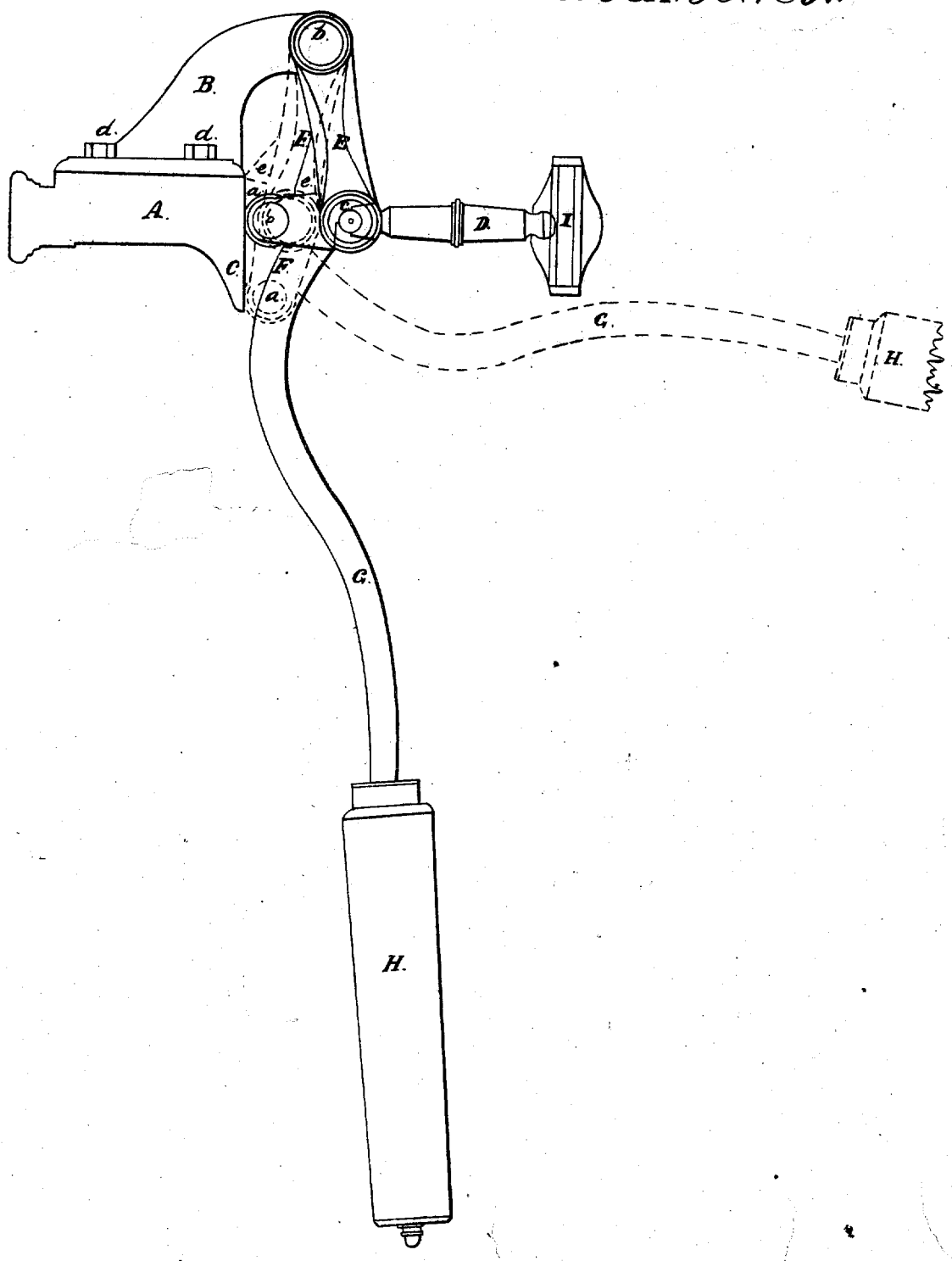

O. Tufts. Sheet 2. 2 Sheets
Hand Printg Press
No 6679X Patented Jul. 30. 1831.
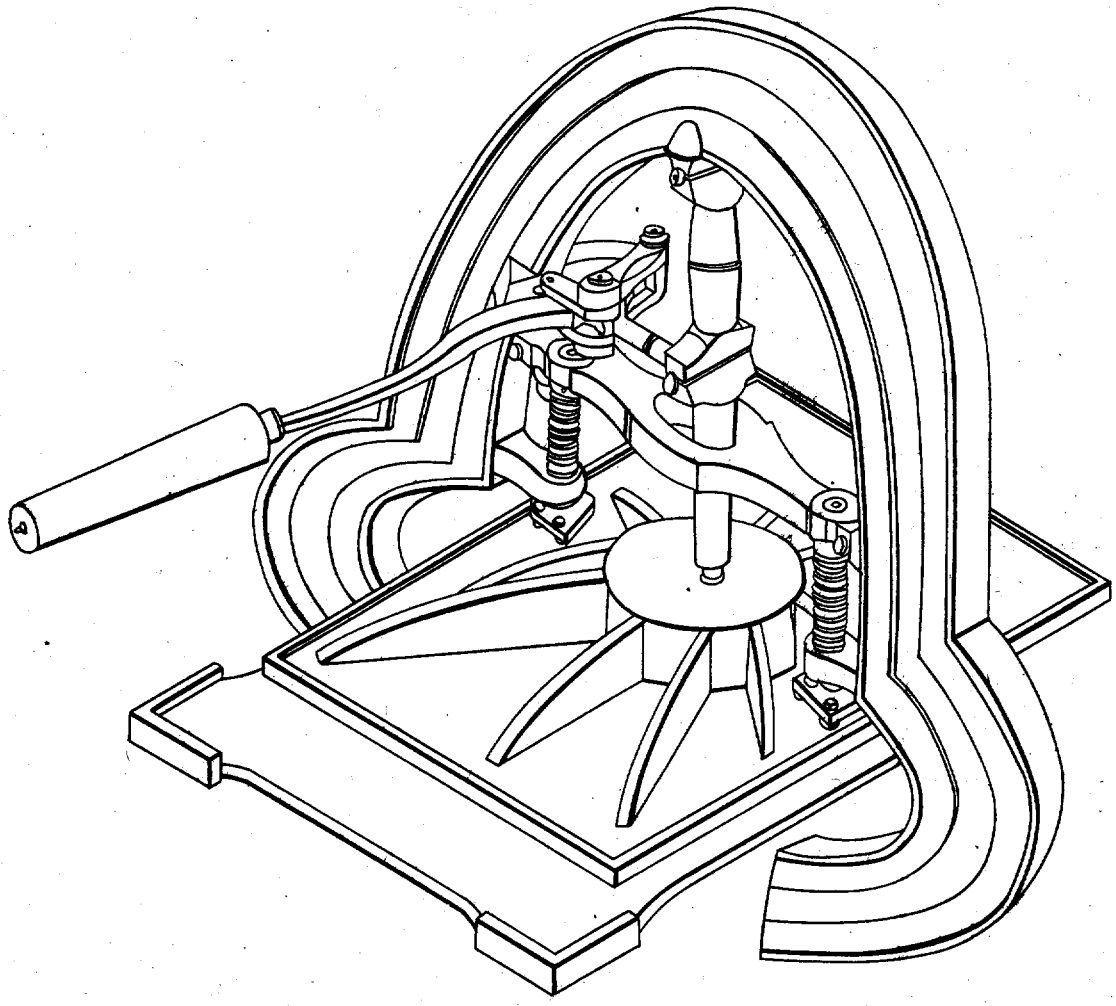

Otis Tufts

The Schedule referred to in these Letters Patent and making
part of the same containing a description in the words of the
said Otis Tufts himself of his improvement in the Prin-
ting Press. To all persons to whom these presents shall come
Otis Tufts of the City of Boston & in the County of Suffolk
& Commonwealth of Massachusetts (mechanician sends
Greeting). Be it known that I the said Otis Tufts have
invented constructed made and applied to use a new and
useful improvement in the machine called the Printing
Press. My improvement consists of a combination of ma-
chinery in a manner new & hitherto unused for the purpose
of straightening the progressive or toggle jointed lever by
an easy and nearly uniform pull. The machinery is
simple and moves with little strain or friction. It moves
the pitman in nearly in a right-line with the motion
of the progressive or toggle jointed lever on which it op-
erates to give the impression, and while the working le-
ver in every part of the pull is moved by a strength best
adapted to the power and convenience of the operator, the
power at the point of the impression may be of almost
any desired degree. I use the frame, bed-plate, pattern,
progressive or toggle jointed lever, and spiral springs
nearly in the common manner in which the same are
used in presses generally. My combination which is
for the purpose of driving the pitman on to the progressive
lever to make it straight, employs only the working or
hand lever, the pitman or driving lever, the friction roller,
and the other apparatus, by which the pitman is made
to bear & ~~operate~~ on the progressive lever. Every part of the
machinery I use, has been before used, separately, & for
other purposes, but the combination I claim as new,
to ~~constitute~~ my invention, & it may be conveniently
employed

[illegible]

employed instead of the existing machinery to produce the im-
pression in the [illegible] heretofore used. My improvement is represen-
ted in two drawings or plates which accompany this specifi-
cation and are made a part of it. Plate No 1 is a perspective
drawing of so much of the printing frame or press with the platen,
bed-plate & other machinery as is necessary to exhibit & explain
my invention: and this is drawn on a scale of one inch and
a half to a foot: Plate No 2. is a section, plan, or top view of
one side of the frame and of the machinery and its combination
which constitutes my invention, and this is drawn on a scale
of three inches to the foot. On this plan the red lines represent
the hand lever the friction roller a. the shank E the joint
c, and the bar E, in their position before the pull is commen-
ced and the black lines represent them when the pull is
finished at the point when the impression is completed.
This plan represents the whole of my invention which is
described as follows: A. represents a section of one side
of the common frame of the printing press (to wit, the side
by which the operator stands: and is thus represented as
the most convenient mode of shewing how my combination
of machinery is connected with it.) B. represents an arm
of cast iron or other substance fastened on to the side of the
frame, on the back side of, and even with, the section A.
by four screws, of which two by the upper side of the arm
are shown at d. d. and the two others are below them
near the lower side of the arm and not visible in the figure
This arm must be of sufficient depth & thickness to
form a bearing at the joint b. sufficient to sustain
the operation of the machinery. C represents a piece of
cast iron or other substance, either cast onto or made sep-
arately & fastened on to the side of the frame of which a section
is represented at A. The use of this is to form a bearing in ex-
tension of and in addition to the space [illegible] the frame [illegible]

for the friction roller a.. In the machine I now use, and which is represented on the plan, I use this projection & also the space for the friction roller across the frame as a plane; and this will probably be found the most convenient form. But I have curved that surface & it may be varied in my principle by its being curved either way on the projecting part across the frame & in the whole course that the friction roller travels it may proceed on a plane or on a curve, varying in any and every desired manner as experience or the taste of the operator may require, to render the pull uniformly [illegible] equal or to adapt the required strength in the best possible manner to the efforts of the operator. D represents the pitman or driving lever which bears upon the progressive lever. This pitman lever or bar has nothing new in its formation, but in my combination it is driven on to the progressive lever nearly in a right line with its motion while it progresses to effect the impression, and in this consists one of the advantages of my invention. E represents a strong bar or link proceeding from the joint b. to the joint c. F is a shank or extension of the working lever, turning nearly at right angles from the handle part of it at the moving joint b, and receiving at the end of it the friction roller a.. G. is the working lever made of wrought iron or other suitable substance. H is a piece of mahogany or other wood on the end of the working lever of a suitable size for the operator's hand. I is a part of the lower division of the progressive lever, with a socket to receive the end of the pitman. At the upper part of the piece I, is the toggle-joint of the progressive lever. a represents the friction roller and being moved by the motion of the working lever it proceeds on the plane or other surface before described, it projects the joint c. & gives motion to the pitman which is connected with the joint c. b, represents a stationary joint at at the end of the arm B. which receives and sustains the bar
E. c. is another and a moving joint which connects the other
end of the bar E with the working lever at the point where
the shank F commences. By means of this combination,
when the working lever is moved from its place of rest as repre-
sented by the red lines to the point where the pull is finished
as represented by the black lines, the friction roller is
moved from its place as seen in the red lines, to its place
shown in the black lines, and this gives the whole desir-
ed motion to the pitman and completes the impression.
d. d. represent ~~[illegible]~~ two of the screws by which the arm
B is secured on to the section of the frame A. e. repre-
sents a triangular piece cast on to or otherwise secured
to the side of the link or bar E next to the arm B.
Its use is to terminate the pull at the desired point
and also to check the power and operation of the springs
which raise the platen. In testimony that the ~~[illegible]~~
above is a true specification of my said invention or
improvement as above described I have hereunto set my
hand & seal this ninth day of July in the year of our
Lord one thousand eight hundred and thirty one.

Witnessed
Hugh McCulloch
Augustus Peabody

Otis Tufts